US012675985B2

(12) United States Patent
Marks et al.

(10) Patent No.: US 12,675,985 B2
(45) Date of Patent: Jul. 7, 2026

(54) CHARACTERIZING A CLASSIFICATION DIFFICULTY ASSOCIATED WITH A TARGET DATA ITEM

(71) Applicant: Voxel51, Inc., Ann Arbor, MI (US)

(72) Inventors: Jacob Austin Marks, Weston, CT (US); Brent Austin Griffin, Dexter, MI (US); Brian Edward Moore, Columbus, OH (US); Jason Joseph Corso, Buffalo, NY (US)

(73) Assignee: Voxel51, Inc., Ann Arbor, MI (US)

( * ) Notice: Subject to any disclaimer, the term of this patent is extended or adjusted under 35 U.S.C. 154(b) by 0 days.

(21) Appl. No.: 19/340,057

(22) Filed: Sep. 25, 2025

(65) Prior Publication Data

US 2026/0094422 A1    Apr. 2, 2026

Related U.S. Application Data

(60) Provisional application No. 63/701,921, filed on Oct. 1, 2024.

(51) Int. Cl.
*G06K 9/00* (2022.01)
*G06N 3/0455* (2023.01)
(Continued)

(52) U.S. Cl.
CPC ......... *G06V 10/776* (2022.01); *G06N 3/0455* (2023.01); *G06V 10/764* (2022.01)

(58) Field of Classification Search
CPC .......... G06N 3/045; G06N 20/00; G06N 3/09; G06N 3/08; G06N 3/0464; G06N 3/0455;
(Continued)

(56) References Cited

U.S. PATENT DOCUMENTS

2020/0285906 A1* 9/2020 Do .......................... G16H 15/00
2020/0285939 A1* 9/2020 Baker .................... G06N 3/063
(Continued)

OTHER PUBLICATIONS

Zhang, Weining, Dong Wang, and Xiaoyang Tan. "Data cleaning and classification in the presence of label noise with class-specific autoencoder." International symposium on neural networks. Cham: Springer International Publishing, 2018. (Year: 2018).*

(Continued)

*Primary Examiner* — Hadi Akhavannik
(74) *Attorney, Agent, or Firm* — Van Pelt, Yi & James LLP

(57) ABSTRACT

A dataset comprising a plurality of data items is received, wherein at least a portion of the plurality of data items is each associated with a corresponding class label from labels of a plurality of classes. For each class of the plurality of classes, a separate class-conditional reconstructor is trained on one or more of the data items associated with that class. For a target data item in the dataset having a target class label among the labels of the plurality of classes, a first reconstruction error is calculated using the class-conditional reconstructor trained for the target class label, a second reconstruction error is calculated using a class-conditional reconstructor trained for a class other than the target class label, a ratio of the first reconstruction error to the second reconstruction error is determined, and using the ratio, a classification associated with the target data item is characterized.

19 Claims, 5 Drawing Sheets

200

Receive dataset — 202

Extract feature vectors — 204

Train class-conditional reconstructors — 206

Calculate first (in-class) reconstruction error — 208

Calculate second (out-of-class) reconstruction error — 210

Determine reconstruction error ratio — 212

Characterize classification — 214

(51) Int. Cl.
  *G06V 10/764*        (2022.01)
  *G06V 10/776*        (2022.01)

(58) Field of Classification Search
  CPC ...... G06N 3/084; G06N 3/047; G06N 3/0895;
  G06N 3/0475; G06N 3/088; G06N 3/094;
  G06N 3/044; G06N 7/01; G06N 5/01;
  G06N 3/096; G06N 3/0985; G06N 3/082;
  G06N 3/048; G06N 3/04; G06N 3/0499;
  G06N 20/20; G06N 3/0442; G06N
  3/0495; G06N 5/022; G06N 3/063; G06N
  20/10; G06N 5/02; G06N 5/04; G06N
  3/098; G06N 3/006; G06N 3/091; G06N
  3/092; G06N 3/042; G06N 3/02; G06N
  5/045; G06N 3/105; G06N 5/025; G06N
  5/046

See application file for complete search history.

(56)                    References Cited

U.S. PATENT DOCUMENTS

2020/0320371 A1*  10/2020  Baker ................... G06N 3/088
2021/0357680 A1*  11/2021  Chen .................. G06V 10/7753
2022/0028180 A1*   1/2022  Wong .................... G06V 20/64
2022/0207001 A1*   6/2022  Ong .................... G06N 3/0464

OTHER PUBLICATIONS

Labaien, Jokin, Ekhi Zugasti, and Xabier De Carlos. "DA-DGCEx:
Ensuring validity of deep guided counterfactual explanations with
distribution-aware autoencoder loss." arXiv preprint arXiv:2104.
09062 (2021). (Year: 2021).*

* cited by examiner

100

200

Receive dataset — 202

Extract feature vectors — 204

Train class-conditional reconstructors — 206

Calculate first (in-class) reconstruction error — 208

Calculate second (out-of-class) reconstruction error — 210

Determine reconstruction error ratio — 212

Characterize classification — 214

500

CHARACTERIZING A CLASSIFICATION DIFFICULTY ASSOCIATED WITH A TARGET DATA ITEM

CROSS REFERENCE TO OTHER APPLICATIONS

This application claims priority to U.S. Provisional Patent Application No. 63/701,921 entitled CLASS-WISE AUTO-ENCODERS MEASURE CLASSIFICATION DIFFI-CULTY AND DETECT LABEL MISTAKES filed Oct. 1, 2024 which is incorporated herein by reference for all purposes.

BACKGROUND OF THE INVENTION

As machine learning systems are increasingly deployed in real-world applications, the quality of the training data has become a critical determinant of model performance. Both predictive and generative ML models rely on sufficiently large and diverse high-quality datasets. However, even popular visual datasets like CIFAR-100, Caltech-256, and ImageNet can have hundreds or thousands of data quality issues, including up to 10% label errors. Consequently, curating a high-quality dataset requires not only data collection but also data cleaning, characterization, evaluation, and refinement.

Nevertheless, existing methods for data quality assessment are inherently limited. Methods that seek to estimate the classification difficulty of a sample or dataset are either model-dependent, computationally infeasible, or break down when applied to challenging datasets. For example, traditional methods may require training large neural networks on the entire dataset, which in itself requires accurate labels to be reliable. Additionally, many existing approaches are specific to particular model architectures or data types, limiting their generalizability across different domains and modalities. Similarly, mislabel detection methods either rely on training a strong classifier on the dataset, which becomes increasingly time and compute-intensive for more complex datasets, or exhibit degraded performance on datasets with complex decision boundaries. Many state-of-the-art misla-bel detection approaches require multiple training runs of deep neural networks, making them impractical for large-scale dataset curation workflows.

An autoencoder is a type of unsupervised neural network consisting of an encoder-decoder pair: the encoder maps input data to a lower-dimensional representation, and the decoder takes the compressed, lower-dimensional represen-tation and attempts to reconstruct the original input data. The reconstruction quality serves as a measure of how well the autoencoder has learned to represent the input data distri-bution. Autoencoders have a rich history in machine learn-ing and have been used for dimensionality reduction, feature learning, data compression, and generative modeling. Vari-ants such as denoising autoencoders and variational auto-encoders (VAEs) which learn probabilistic representations, and adversarial autoencoders further expanded their capa-bilities. Modern applications include their use in the pre-training of diffusion models for image generation. Autoen-coders have also been used in the context of visual anomaly detection, where autoencoders trained on normal data can identify anomalous samples by their high reconstruction errors.

BRIEF DESCRIPTION OF THE DRAWINGS

Various embodiments of the invention are disclosed in the following detailed description and the accompanying draw-ings.

DETAILED DESCRIPTION

Figure 1:
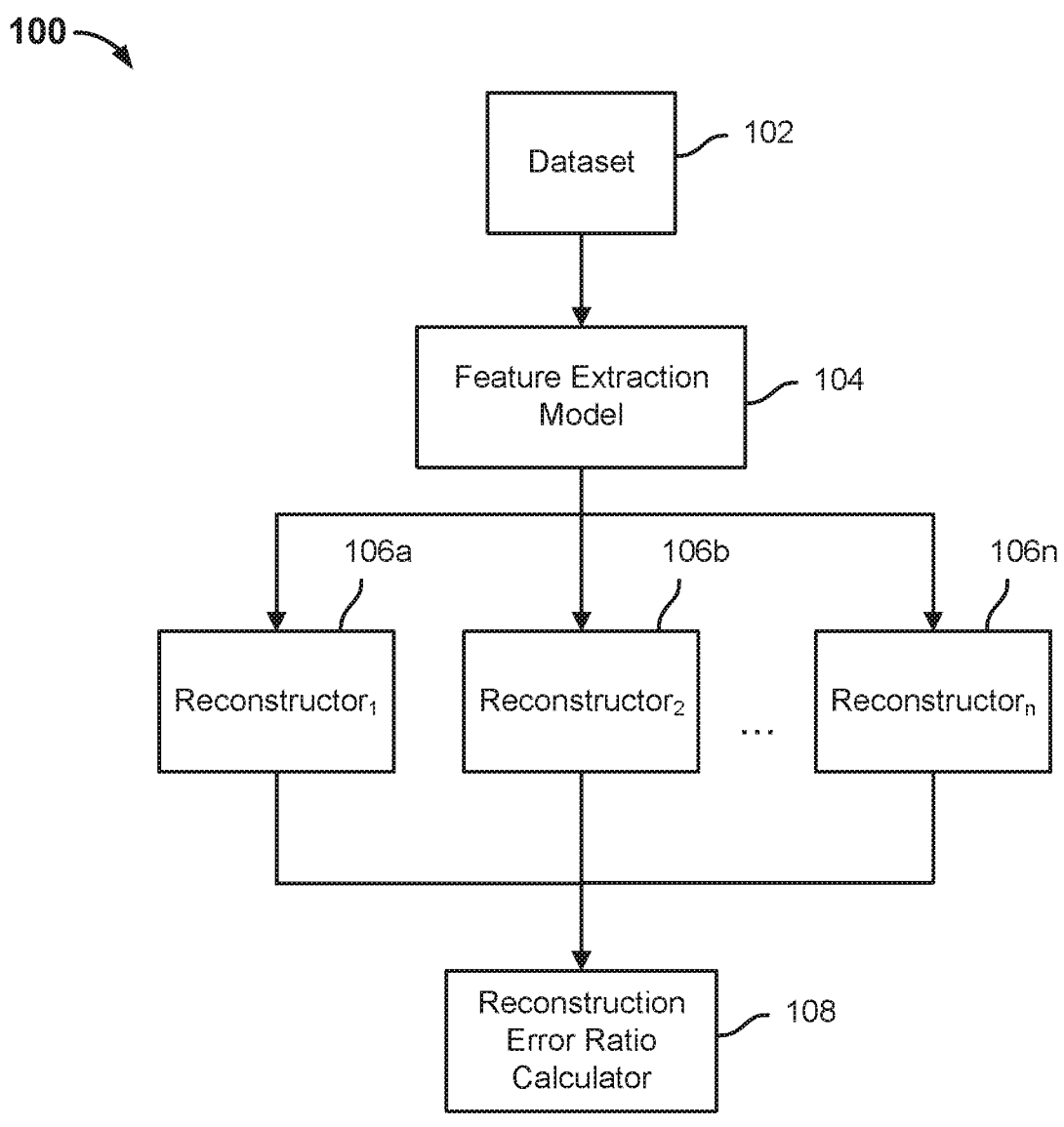
FIG. 1 is a block diagram illustrating a system for implementing class-wise autoencoders to measure classifi-cation difficulty and detect label mistakes in accordance with some embodiments.

The invention can be implemented in numerous ways, including as a process; an apparatus; a system; a composi-tion of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as tech-niques. In general, the order of the steps of disclosed processes may be altered within the scope of the invention. Unless stated otherwise, a component such as a processor or a memory described as being configured to perform a task may be implemented as a general component that is tem-porarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying fig-ures that illustrate the principles of the invention. The invention is described in connection with such embodi-ments, but the invention is not limited to any embodiment. The scope of the invention is limited only by the claims and the invention encompasses numerous alternatives, modifi-cations and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Modern machine learning requires high-quality datasets. As such, the ability to detect potential mislabeling of data examples is of utmost importance in order to improve performance. Systems and methods for implementing class-wise autoencoders to measure classification difficulty and detect label mistakes are disclosed herein. Specifically, the class-wise autoencoders are used to reconstruct examples from a dataset such that reconstruction error ratios (RERs) can be computed for each data item.

In various embodiments, the disclosed approach addresses several key limitations of existing methods. Unlike traditional approaches that require training full clas-sification models, the present invention uses lightweight autoencoders that can be trained quickly and in parallel. This makes the approach scalable to large datasets and multiple data modalities. The method is also model-agnostic, working with features extracted from any feature extraction model (e.g., a pretrained artificial intelligence model or a visual foundation model like CLIP VIT-B/32 or DINOv2-B).

RERs offer several key advantages, such as:

Efficiency: Reconstructors can be trained in seconds, and training and inference can be parallelized over CPU cores. Further acceleration can be achieved with a minimal reduction in performance by fitting the reconstructors on a fraction of the data. In many cases state-of-the-art performance is experimentally observed when fitting on just 20 samples per class, making the approach practical even for classes with limited training data.

Interpretability: RERs can be used to compare the relative difficulty of specific samples, entire classes, data subsets, and entire datasets. They enable dataset-wide error rate estimation and provide principled label mistake probabilities for each sample.

Generality: RERs provide a unified pipeline for processing datasets of different sizes and modalities, and work with features from any foundation model. They also extend readily to challenging datasets and datasets with arbitrarily many classes.

RERs perform remarkably well in both classification difficulty and mislabel detection tasks. Through a comprehensive study across visual datasets, strong correlations have been found between RER-based difficulty measures and state-of-the-art classification error rates. By interpreting sample difficulty scores as mislabel likelihood scores and employing a simple threshold ansatz to classify samples as mistaken, RERs have been found to outperform other feature-based mislabel detection techniques under various noise conditions.

In some embodiments, implementing class-wise autoencoders to measure classification difficulty and detect label mistakes includes receiving a dataset comprising a plurality of data items, where at least a portion of the plurality of data items is associated with a corresponding class label from labels of a plurality of classes. In some embodiments, the data items comprise image data. The data items can comprise various modalities including image data, text data, audio data, sensor data, or tabular data. For multimodal datasets, the method can be applied to each modality separately or to concatenated multimodal feature representations.

In some embodiments, a preprocessing step of extracting feature representations from the raw data items is performed using a pretrained feature extraction model (e.g., a pretrained artificial intelligence model or a visual foundation model like CLIP VIT-B/32 or DINOv2-B). This step transforms raw data (e.g., images, text) into fixed-dimensional feature vectors that serve as input to the autoencoders. The choice of feature extraction model can significantly impact performance, with more recent and powerful models generally providing better results.

In some embodiments, implementing class-wise autoencoders further includes training, for each class of the plurality of classes, a separate class-conditional reconstructor on one or more of the data items associated with that class. Each class-conditional reconstructor learns to represent the distribution of feature vectors belonging to its associated class. The reconstructors can be trained independently and in parallel, making the approach highly scalable.

In some embodiments, each class-conditional reconstructor is an autoencoder, specifically a shallow autoencoder with one or more hidden layers. The shallow architecture is computationally efficient while being expressive enough to capture the essential characteristics of each class's feature distribution. Alternative architectures include deeper autoencoders, convolutional autoencoders for spatial data, or recurrent autoencoders for sequential data.

In some embodiments, training the class-conditional autoencoders is performed in parallel over multiple CPU cores or GPU devices, significantly reducing the total training time. The parallel training approach is feasible because each autoencoder is trained independently on its respective class data.

The dataset consisting of features and labels may be defined formally as $$D = (X, y), \tag{1}$$

where $X \in \mathbb{R}^{N \times d}$ is a matrix of d-dimensional features for each sample, $y \in \{0, 1, \ldots, N_c-1\}^N$ is a vector containing a single integer-valued label for each sample, N is the number of samples, Nc is the number of classes, and the features may be features extracted from a row dataset using a feature extraction model.

Letting $X^c = \{x = X_{j,:} | y_j = c\}$ denote the subset of features in the dataset that have assigned (potentially noisy) label c, training an autoencoder for each class includes training an encoder-decoder pair (f, g), where $f: \mathbb{R}^d \to \mathbb{R}^{d_{latent}}$ and g: $\mathbb{R}^{d_{latent}} \to \mathbb{R}^d$, such that $$r(x) = g(f(x)), \tag{2}$$

is the reconstruction function.

Continuing with the above notation, the shorthand notation $x^c$ may be used to denote that feature x has label c, and $r^c$ to denote the autoencoder trained on $X^c$. The reconstruction error for a feature vector x with respect to reconstructor r is defined as the difference between the original feature and the reconstruction.

Furthermore, for most datasets with meaningful intra-class differences, it can be assumed that on average the reconstructor trained on $X^c$ will be better at reconstructing features with label c than features with other labels $c' \neq c$. Explicitly, letting $\Delta^c(x^c) = \|r^c(x^c) - x^c\|$ denote the reconstruction error for a sample with label c with respect to $r^{c'}$, it can be assumed that $\mathbb{E}_{x^c}[\Delta^c(x)] < \mathbb{E}_{x^{c'}}[\Delta^c(x)]$. This assumption has been found to hold true experimentally.

FIG. 1 is a block diagram illustrating a system for implementing class-wise autoencoders to measure classification difficulty and detect label mistakes in accordance with some embodiments. In the example shown, system 100 includes dataset 102, feature extraction model 104, reconstructors 106a-n, and reconstruction error ratio calculator 108.

Dataset 102 comprises a plurality of data items, where at least a portion of the plurality of data items is associated with a corresponding class label from labels of a plurality of classes. In some embodiments, the data items comprise image data. The data items can comprise various types of data including image data, text data, audio data, sensor readings, time series data, or tabular data. The dataset may contain both labeled and unlabeled samples, with the method being applied to assess the quality of the labeled samples.

Feature extraction model 104 is configured to extract feature vectors for each of the data items of the plurality of data items in dataset 102. In some embodiments, the feature extraction model transforms raw data into fixed-dimensional numerical representations suitable for processing by the autoencoders. In some embodiments, feature extraction model 104 is a pretrained artificial intelligence model (e.g., a visual foundation model like CLIP VIT-B/32 or DINOv2-B). In some embodiments, feature extraction model 104 may be a combination of multiple feature extractors, with features being concatenated or fused to create richer representations. For example, for image data, both visual features (from CLIP) and textual features (from captions or metadata) might be combined.

Reconstructors 106a-n are class-conditional reconstructors each trained on the feature vectors extracted by feature extraction model 104 for one or more data items associated with a class label of the plurality of classes. For example, reconstructor is trained on data items with class label 1, reconstructor$_2$ is trained on data items with class label 2, and so on.

In some embodiments, each class-conditional reconstructor 106a-n is an autoencoder (i.e., a type of unsupervised neural network consisting of an encoder-decoder pair: the encoder maps input data to a lower-dimensional representation, and the decoder takes the compressed representation and attempts to reconstruct the original input data). In some embodiments, each autoencoder is a shallow autoencoder. In some embodiments, training each autoencoder means training each autoencoder on feature vectors (e.g., CLIP VIT-B/32 features) extracted from the data items in the class by feature extraction model 104. In some embodiments, before passing feature vectors into the autoencoders, min-max normalization is performed.

In some embodiments, each autoencoder is trained using Universal Manifold Approximation and Projection (UMAP) regularization loss (e.g., using the ParametricUMAP class from the umap-learn Python library) as an objective function for the neural network. In some embodiments, each class autoencoder is regularized with a small UMAP graphlayout loss term which helps the very compact models learn the local and global structure of each class manifold.

In some embodiments, the encoder and decoder which make up each autoencoder are defined in Tensorflow Keras and each have one hidden layer. In some embodiments, the autoencoder is implemented by some other method. Small l2-regularization and dropout have been found experimentally to stabilize performance. In some embodiments, ReLu activations are used for intermediate layers, and a sigmoid activation function is used after the last layer in the decoder. The number of training epochs may be predefined (e.g., setting $n_{epochs}$=20, although early stopping has been found to consistently occur before that, as the loss converges quickly). In some embodiments, the autoencoders are regularized using large spread and minimum distance between embedded points.

Each of reconstructors 106a-n is configured to encode an input data item into a lower-dimensional representation and then attempt to reconstruct the original input data item by decoding the compressed representation.

Reconstruction error ratio calculator 108 is configured to, for any target data item having a target class label among the labels of the plurality of classes (or its corresponding feature vector), determine a reconstruction error ratio (RER). The reconstruction error ratio may be determined by calculating a first reconstruction error using a class-conditional reconstructor of reconstructors 106a-n trained for the target class label, calculating a second reconstruction error using a class-conditional reconstructor of reconstructors 106a-n trained for a class other than the target class label, and determining a ratio of the first reconstruction error to the second reconstruction error.

In some embodiments, reconstruction error ratio calculator 108 is configured to select the lowest out-of-class reconstruction error (i.e., the minimum out of all the reconstruction errors calculated for the target data item using a reconstructor trained for a class other than the target class label) and use it as the second reconstruction error in determining the reconstruction error ratio. In some embodiments, this approach provides a conservative estimate by comparing against the best-fitting alternative class.

In alternative embodiments, the second reconstruction error might be computed as the average of all out-of-class reconstruction errors, the median out-of-class reconstruction error, or the reconstruction error from a randomly selected alternative class. Different choices may be appropriate depending on the specific application and dataset characteristics.

Figure 2:
FIG. 2 is a flow diagram illustrating a process for imple-menting class-wise autoencoders to measure classification difficulty and detect label mistakes in accordance with some embodiments.
Figure 2:
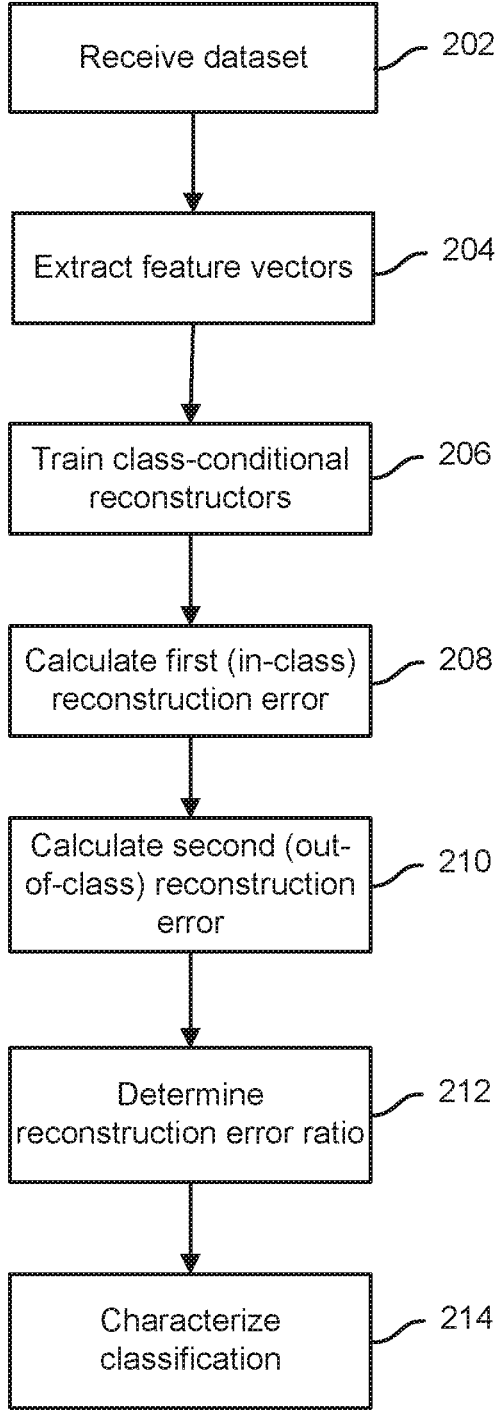

FIG. 2 is a flow diagram illustrating a process for implementing class-wise autoencoders to measure classification difficulty and detect label mistakes in accordance with some embodiments. Process 200 may be implemented by a system for implementing class-wise autoencoders to measure classification difficulty and detect label mistakes such as system 100.

At 202, a dataset is received. The dataset may be a dataset such as 102. The dataset may comprise a plurality of data items, where at least a portion of the plurality of data items is associated with a corresponding class label from labels of a plurality of classes. In some embodiments, the data items comprise image data. The data items can represent various modalities including images, text documents, audio recordings, sensor measurements, or structured tabular data. The dataset may also include metadata, timestamps, or other auxiliary information that could be incorporated into the analysis. In some embodiments, the dataset undergoes preliminary quality checks and preprocessing steps such as duplicate removal, format standardization, and basic sanity checks to ensure data integrity before proceeding with the analysis.

At 204, feature vectors are extracted for each of the data items. In some embodiments, the data items are transformed into feature vectors by feeding them through a feature extraction model such as feature extraction model 104. In some embodiments, the feature extraction model is a pretrained artificial intelligence model (e.g., a visual foundation model like CLIP VIT-B/32 or DINOv2-B). This allows for unified processing and comparison across datasets. The choice of feature extraction model can significantly impact the performance of the downstream classification assessment. More recent and powerful models generally provide better feature representations, leading to more accurate difficulty assessments and mislabel detection. In some embodiments, multiple feature extraction models are used, and their outputs are combined through concatenation or learned fusion techniques. Feature vectors may undergo additional preprocessing such as dimensionality reduction (PCA, t-SNE), normalization (min-max, z-score standardization), or whitening to improve the stability and performance of autoencoder training.

At 206, for each class of the plurality of classes, a separate class-conditional reconstructor is trained on one or more of the data items associated with that class. In some embodiments, each class-conditional reconstructor is an autoencoder. In some embodiments, the autoencoder is a shallow autoencoder. In some embodiments, training each autoencoder means training each autoencoder on feature vectors (e.g., CLIP VIT-B/32 features) extracted from the data items in the class. In some embodiments, before passing feature vectors into the autoencoders, min-max normalization is performed.

In some embodiments, training the class-conditional autoencoders is done in parallel over CPU cores. In some embodiments, each autoencoder is trained using Universal Manifold Approximation and Projection (UMAP) regularization loss (e.g., using the ParametricUMAP class from the umap-learn Python library) as an objective function for the neural network. In some embodiments, each class autoencoder is regularized with a small UMAP graphlayout loss term which helps the very compact models learn the local and global structure of each class manifold.

In some embodiments, the encoder and decoder which make up each autoencoder are defined in Tensorflow keras and each have one hidden layer. Small l2-regularization and dropout have been found experimentally to stabilize performance. In some embodiments, ReLu activations are used for intermediate layers, and a sigmoid activation function is used after the last layer in the decoder. The number of training epochs may be predefined (e.g., setting $n_{epochs}=20$, although early stopping has been found to consistently occur before that, as the loss converges quickly). In some embodiments, the autoencoders are regularized using large spread and minimum distance between embedded points.

Figure 3:
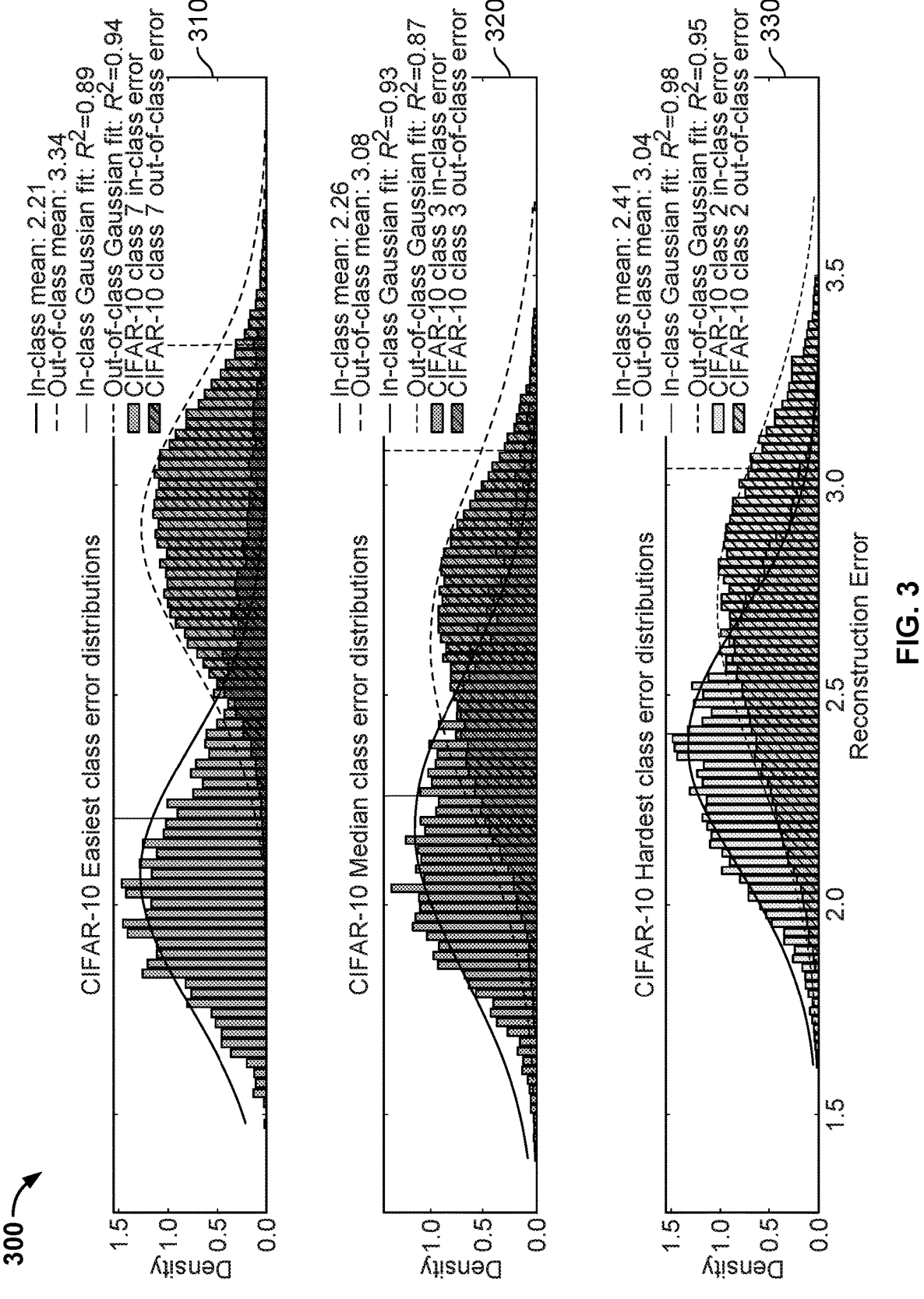
FIG. 3 shows experimental reconstruction error distribu-tions for in-class and out-of-class samples for three classes from the CIFAR-10 dataset

FIG. 3 shows experimental reconstruction error distributions for in-class and out-of-class samples for three classes from the CIFAR-10 dataset. Graph 310 shows reconstruction error distributions for in-class and out-of-class samples for the easiest class (i.e., the class with the lowest average reconstruction error across samples). Graph 320 shows reconstruction error distributions for in-class and out-of-class samples for the average class (i.e., the class with the median average reconstruction error across samples). Graph 330 shows reconstruction error distributions for in-class and out-of-class samples for the most difficult class (i.e., the class with the highest average reconstruction error across samples). In all classes, both in-class and out-of-class reconstruction errors tend to follow Gaussian distributions with distinct mean and variance.

The variance of these intra-class and inter-class reconstruction errors may depend on the features used to fit the autoencoder, the complexity of the data, and the expressiveness of the encoder-decoder pair. Consequently, reconstruction errors can take on a wide range of values in $\mathbb{R}^{+}$, making it hard to draw conclusions from reconstruction errors alone. Reconstruction error ratios, on the other hand, produce dimensionless quantities $\phi_{c_1,c_2}=\Delta^{c_1}/\Delta^{c_2}$ of order one, which can be used to assess whether a new unlabeled sample belongs to class $c_1$ or $c_2$.

At 208, for a target data item in the dataset having a target class label among the labels of the plurality of classes, a first reconstruction error is calculated using a class-conditional reconstructor trained for the target class label (i.e., an in-class reconstruction error). The first reconstruction error for the target data item is defined as the difference between the original feature vector for the target data item (i.e., the feature vector extracted at 204) and the reconstruction vector generated by the class-conditional reconstructor trained for the target class label. In some embodiments, the difference is calculated as the element-wise difference between the vectors.

At 210, for the target data item, a second reconstruction error is calculated using a class-conditional reconstructor trained for a class other than the target class label (i.e., an out-class reconstruction error). The second reconstruction error for the target data item is defined as the difference between the original feature vector for the target data item (i.e., the feature vector extracted at 204) and the reconstruction vector generated by the class-conditional reconstructor trained for the class other than the target class label. In some embodiments, the difference is calculated as the element-wise difference between the vectors.

In some embodiments, the second reconstruction error is the lowest out-of-class reconstruction error (i.e., the minimum out of all the reconstruction errors calculated for the target data item using a reconstructor trained for a class other than the target class label).

At 212, a ratio of the first reconstruction error to the second reconstruction error is determined. This reconstruction error ratio may be defined as $$\chi(x^c) = \frac{\Delta^c(x^c)}{\min_{c' \neq c} \Delta^{c'}(x^c)}, \tag{3}$$

where target data item $x^c$ has label c. $\Delta^c(x^c)=\|r^c(x^c)-x^c\|$ is the first, in-class reconstruction error calculated at 208, and $$\min_{c' \neq c} \Delta^{c'}(x^c)$$

is the second, minimum out-of-class reconstruction error calculated at 210, where c' is a label other than c.

In various embodiments, reconstruction error ratios provide intuitive interpretation: values close to 1 indicate that the in-class and best out-of-class reconstructors perform similarly, suggesting potential classification difficulty or mislabeling. Values significantly less than 1 indicate that the target class reconstructor performs much better than alternatives, suggesting confident correct labeling. Values greater than 1 indicate that an alternative class reconstructor performs better than the target class reconstructor, strongly suggesting potential mislabeling.

At 214, a classification associated with the target data item is characterized using the reconstruction error ratio determined at 212. In some embodiments, the classification associated with the target data item is provided as an output to a user.

In some embodiments, the characterized classification is the target data item's classification difficulty. The target data item's classification difficulty may be determined based on how close the first reconstruction error is to the second reconstruction error, as demonstrated by the reconstruction error ratio. A reconstruction error ratio greater than 1 indicates that there exists a class c'≠c whose reconstruction function represents the sample well relative to the ground truth class, leading to a hard classification difficulty. A reconstruction error less than 1, on the other hand, is a strong indicator that the noisy ground truth class is accurate, leading to a low classification difficulty.

In various embodiments, the characterization can take several forms depending on the specific application requirements. For example:

Classification Difficulty Assessment: The reconstruction error ratio directly indicates the difficulty of correctly classifying the data item. Items with ratios close to 1 represent difficult classification cases where multiple classes provide similarly good reconstructions. Items with ratios well below 1 represent easy classification cases where the target class provides much better reconstruction than alternatives.

Mislabel Detection: Items with reconstruction error ratios above a predetermined threshold (typically around 1.0-1.2) are flagged as potentially mislabeled. The threshold can be tuned based on the desired trade-off between precision and recall in mislabel detection.

Confidence Scoring: The reconstruction error ratio can be transformed into a confidence score indicating the likelihood that the assigned label is correct. Various transformation functions can be used, such as sigmoid functions or empirically derived mappings based on validation data.

Figure 4:
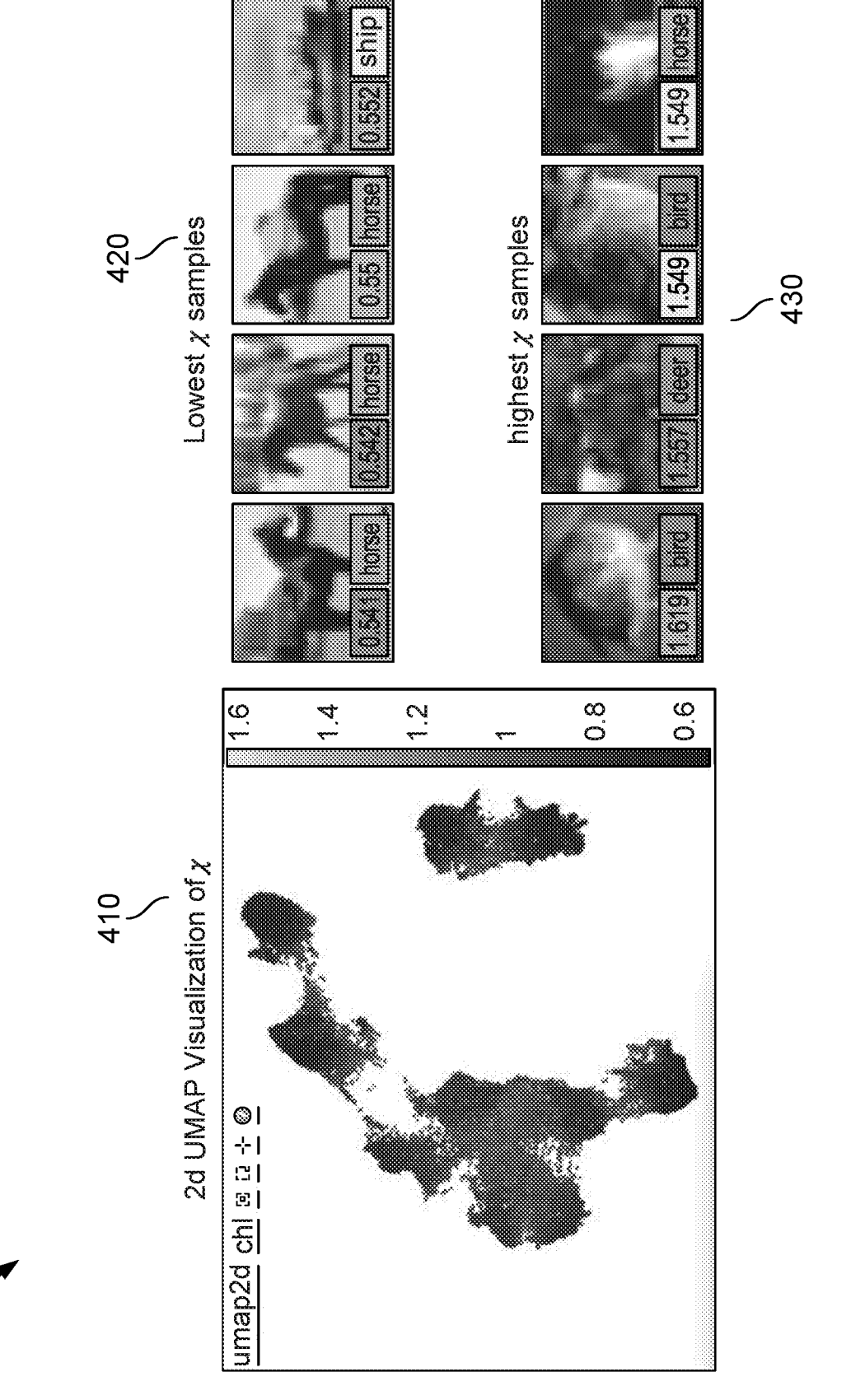
FIG. 4 shows a visualization of reconstruction error ratios (x) for the CIFAR-10 dataset, along with images from the easiest and hardest samples.

FIG. 4 shows a visualization of reconstruction error ratios ($\chi$) for the CIFAR-10 dataset, along with images from the easiest and hardest samples. Left visualization 410 is a two-dimensional UMAP visualization of CLIP VIT-B/32 features used to train class reconstructors, where each point corresponds to a sample. Points are shaded by reconstruction error ratio, with darker shades indicating higher values and higher values indicating higher classification difficulty. Top-right visualization 420 shows the four samples from the dataset that are considered easiest in terms of classification difficulty (i.e., the samples with the lowest reconstruction error ratio). Bottom-right visualization 420 shows the four samples from the dataset that are considered hardest in terms of classification difficulty (i.e., the samples with the highest reconstruction error ratio). Experiments find that high-RER samples are often (but not always) located near class decision boundaries.

In some embodiments, the characterized classification is whether the target item is potentially mislabeled. The target data item may be considered potentially mislabeled if the reconstruction error ratio exceeds a certain threshold. In some embodiments, a probability that a target data item is mislabeled is computed based on the calculated ratio of reconstruction errors. In some embodiments, the probability that a data item is mislabeled is computed for one or more data items and provided to a user.

In some embodiments, a classification difficulty is calculated for the entire dataset. Calculating a classification difficulty for the entire dataset includes determining a reconstruction error for each data item in the dataset (i.e., repeating steps 208-212 of process 200 for each data item). The classification difficulty for the entire dataset may be calculated as the average reconstruction error across all data items in the dataset. The dataset's average classification difficulty may be calculated as the dataset determinant:

$$\bar{\chi} = \mathbb{E}_{(x,y)}[\chi(x^c)], \tag{4}$$

A measure of classification difficulty can be helpful in informing a user that additional preprocessing or human labeling is necessary in a dataset.

Figure 5:
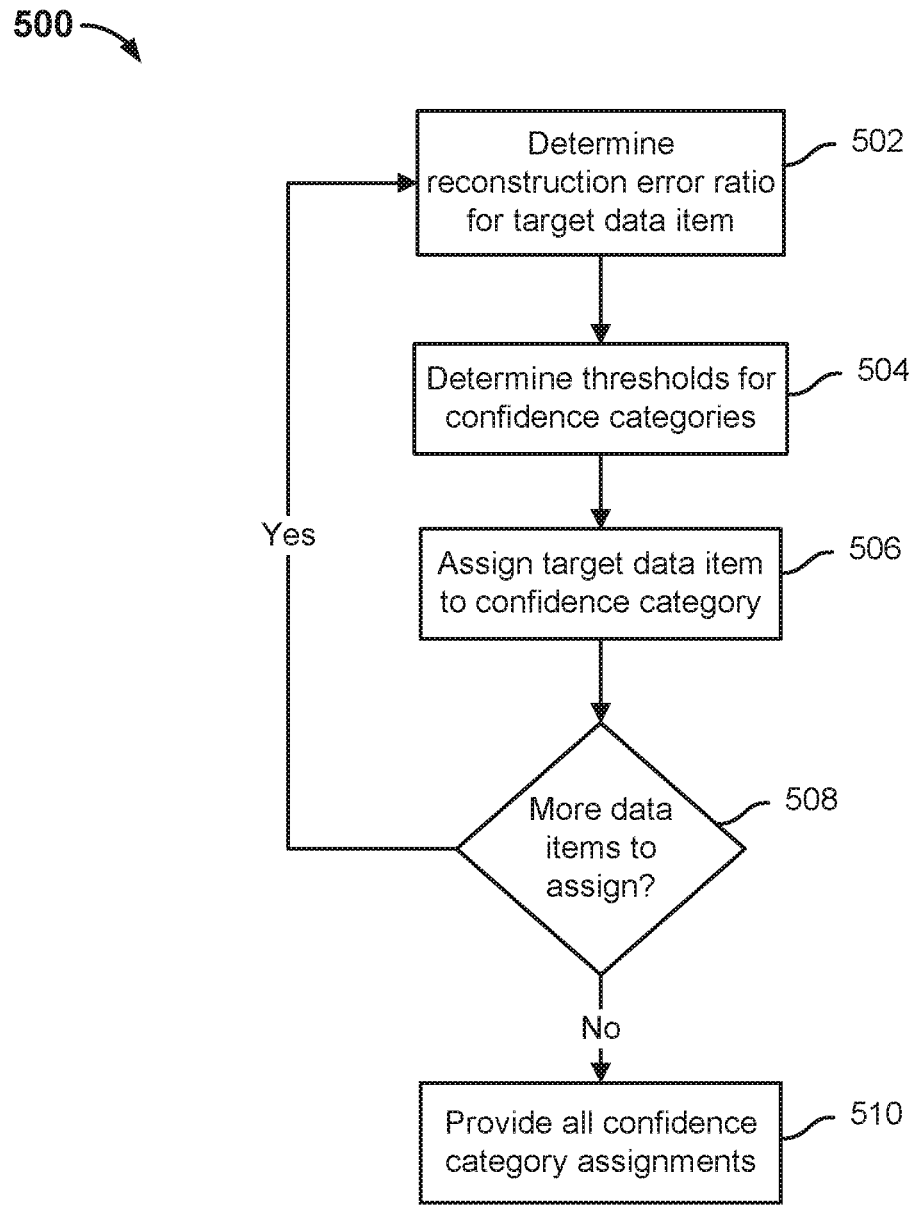
FIG. 5 is a flow diagram illustrating a process for using reconstruction error ratios to assign data items to confidence categories in accordance with some embodiments.

FIG. 5 is a flow diagram illustrating a process for using reconstruction error ratios to assign data items to confidence categories in accordance with some embodiments. Process 500 may be implemented as part of or as a continuation of process 200.

At 502, a reconstruction error ratio is determined for a target data item. The reconstruction error ratio for the target data item may be determined through steps 202-212 of process 200.

The target data item may have a target class label among the labels of a plurality of classes associated with a labeled dataset such as dataset 102. The reconstruction error ratio may be determined by calculating a first reconstruction error using a class-conditional reconstructor such as one of reconstructors 106*a-n* trained for the target class label, calculating a second reconstruction error using a class-conditional reconstructor such as reconstructors 106*a-n* trained for a class other than the target class label, and determining a ratio of the first reconstruction error to the second reconstruction error.

At 504, reconstruction error ratio thresholds are determined for a plurality of confidence categories, where the confidence categories indicate different levels of confidence in the correctness of the label corresponding to the target data item. For example, three confidence categories may be initialized with one indicating high confidence in label correctness, a second indicating low confidence in label correctness, and a third indicating uncertainty. The first category may have a reconstruction error ratio threshold of 0.8 and below, the second may have a reconstruction error ratio threshold of 1.2 and above, and the third may have a reconstruction error ratio threshold of between 0.8 and 1.2.

At 506, the target data item is assigned to one of the plurality of confidence categories based on comparing its reconstruction error ratio to the predetermined thresholds.

At 508, it is determined whether there are more data items from the initial dataset left unassigned. If there are more data items left unassigned, process 500 returns to 502 to assign additional data items to confidence categories. If all the data items from the initial dataset are assigned, process 500 proceeds to 510.

At 510, the category assignments of the data items are provided to a user. The category assignments may be used to determine whether additional preprocessing needs to be done on the dataset to improve label correctness. For example, human annotation may be needed to assign improved labels to data items in confidence categories indicating low levels of correctness or uncertainty based on the reconstruction error ratios. In various embodiments, the provided output can take various forms. For example:

Summary Statistics: Overall distribution of samples across confidence categories Detailed Lists: Specific samples assigned to each category with their ratios and other metadata Visualization: Graphical representations showing the spatial distribution of confidence levels Recommendations: Specific actions recommended for different categories (e.g., manual review for uncertain samples, automated removal of low-confidence samples)

The categorized output enables systematic dataset improvement workflows, such as prioritizing manual annotation efforts on uncertain samples or removing potentially mislabeled samples to improve training data quality.

Additional Embodiments and Variations

In some embodiments, the method incorporates active learning principles by iteratively selecting the most uncertain samples (those with reconstruction error ratios closest to 1) for manual review and relabeling. This approach maximizes the impact of human annotation effort by focusing on the most informative samples.

In some embodiments, the class-conditional reconstructors are updated incrementally as new labeled data becomes available or as existing labels are corrected. This online learning approach allows the system to continuously improve its assessments as the dataset quality improves.

In some embodiments, ensemble methods are used where multiple different autoencoder architectures or feature extraction models are employed, and their reconstruction error ratios are combined through voting, averaging, or learned fusion techniques. Ensemble approaches can improve robustness and accuracy at the cost of increased computational requirements.

In some embodiments, the method is extended to handle hierarchical class structures or multi-label classification scenarios. For hierarchical classes, reconstruction error ratios can be computed at different levels of the hierarchy. For multi-label scenarios, separate ratios can be computed for each label dimension.

In some embodiments, temporal information is incorporated for time-series or sequential data by using recurrent or transformer-based autoencoder architectures that can capture temporal dependencies within each class.

In some embodiments, the method includes automatic hyperparameter optimization using techniques such as Bayesian optimization or grid search to find optimal autoencoder architectures, regularization parameters, and threshold values for specific datasets or domains.

In some embodiments, the system provides interpretability features such as attention maps or gradient-based explanations that help users understand why specific samples are flagged as difficult or potentially mislabeled.

In some embodiments, the method is integrated with data augmentation techniques, where reconstruction error ratios are used to identify samples that would benefit from augmentation and to validate the quality of augmented samples.

In some embodiments, computational efficiency is further improved through various optimization techniques:

Sparse Autoencoders: Using sparse regularization to learn more efficient representations.

Quantization: Reducing precision of model weights and activations to decrease memory usage and increase speed.

Knowledge Distillation: Training smaller student autoencoders from larger teacher models.

Approximation Methods: Using fast approximate nearest neighbor methods for out-of-class error computation.

In some embodiments, multi-modal data is handled by training separate autoencoders for each modality and combining their reconstruction error ratios through learned fusion functions. For example, for datasets containing both images and text, separate visual and textual autoencoders can be trained, and their ratios combined to provide unified assessments.

In some embodiments, domain adaptation techniques are incorporated to handle situations where the feature extraction model or autoencoders are trained on different domains than the target dataset. This includes adversarial training techniques and domain-invariant feature learning methods.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for identifying potentially mislabeled data samples, the method comprising: receiving a dataset comprising a plurality of data items, wherein at least a portion of the plurality of data items is each associated with a corresponding class label from labels of a plurality of classes;

for each class of the plurality of classes, training a separate class-conditional reconstructor on one or more of the data items associated with that class; and for a target data item in the dataset having a target class label among the labels of the plurality of classes:

calculating a first reconstruction error using a class-conditional reconstructor trained for the target class label;

calculating a second reconstruction error using a class-conditional reconstructor trained for a class other than the target class label;

determining a reconstruction error ratio of the first reconstruction error to the second reconstruction error;

using the reconstruction error ratio, characterizing a classification associated with the target data item;

determining that the target data item is potentially mislabeled in response to determining that the reconstruction error ratio exceeds a certain threshold;

assigning the target data item to one of a plurality of confidence categories based on the reconstruction error ratio; and automatically performing a dataset modification operation based on the assigned confidence category, including by excluding the target data item from a training dataset used to train a downstream machine learning classifier.

2. The method of claim 1, wherein the data items comprise image data.

3. The method of claim 1, wherein each class-conditional reconstructor is a shallow autoencoder.

4. The method of claim 1, wherein the second reconstruction error is a minimum reconstruction error for a group of reconstructions calculated using a class-conditional reconstructor trained for a class other than the target class label.

5. The method of claim 1, wherein the classification associated with the target data item is a classification difficulty for the target data item.

6. The method of claim 5, wherein the classification difficulty is determined based on how close the first reconstruction error is to the second reconstruction error.

7. The method of claim 1, wherein the classification associated with the target data item is based on whether the target data item is potentially mislabeled.

8. The method of claim 1, further comprising calculating a classification difficulty for the entire dataset.

9. The method of claim 8, wherein the classification difficulty for the entire dataset is associated with an average of the reconstruction error ratio across all data items in the dataset.

10. The method of claim 1, further comprising providing the classification associated with the target data item as an output.

11. The method of claim 1, further comprising assigning the target data item to one of a plurality of confidence categories based on the ratio of reconstruction errors.

12. The method of claim 11, wherein assigning the target data item to one of the plurality of confidence categories includes comparing the ratio of reconstruction errors to one or more predetermined thresholds.

13. The method of claim 12, wherein the confidence categories comprise a first category indicating high confidence in label correctness, a second category indicating low confidence in label correctness, and a third category indicating uncertainty.

14. The method of claim 11, further comprising providing the category assignment of one or more data items to a user.

15. The method of claim 1, further comprising transforming the data items into feature vectors by feeding them through a pretrained artificial intelligence model.

16. The method of claim 1, further comprising computing a probability that a target data item is mislabeled based on the determined ratio of reconstruction errors.

17. The method of claim 1, further comprising providing a probability that one or more of the data items are mislabeled to a user.

18. A system for identifying potentially mislabeled data samples, the system comprising:

a processor configured to:

receive a dataset comprising a plurality of data items, wherein at least a portion of the plurality of data items is each associated with a corresponding class label from labels of a plurality of classes;

for each class of the plurality of classes, train a separate class-conditional reconstructor on one or more of the data items associated with that class; and for a target data item in the dataset having a target class label among the labels of the plurality of classes:

calculate a first reconstruction error using a class-conditional reconstructor trained for the target class label;

calculate a second reconstruction error using a class-conditional reconstructor trained for a class other than the target class label;

determine a reconstruction error ratio of the first reconstruction error to the second reconstruction error;

use the reconstruction error ratio, characterize a classification associated with the target data item;

determine that the target data item is potentially mislabeled in response to determining that the reconstruction error ratio exceeds a certain threshold;

assign the target data item to one of a plurality of confidence categories based on the reconstruction error ratio; and automatically perform a dataset modification operation based on the assigned confidence category, including by excluding the target data item from a training dataset used to train a downstream machine learning classifier; and a memory coupled to the processor and configured to provide the processor with instructions.

19. A computer program product embodied in a non-transitory computer readable medium and comprising computer instructions for:

receiving a dataset comprising a plurality of data items, wherein at least a portion of the plurality of data items is each associated with a corresponding class label from labels of a plurality of classes;

for each class of the plurality of classes, training a separate class-conditional reconstructor on one or more of the data items associated with that class; and for a target data item in the dataset having a target class label among the labels of the plurality of classes:

calculating a first reconstruction error using a class-conditional reconstructor trained for the target class label;

calculating a second reconstruction error using a class-conditional reconstructor trained for a class other than the target class label;

determining a reconstruction error ratio of the first reconstruction error to the second reconstruction error;

using the reconstruction error ratio, characterizing a classification associated with the target data item;

determining that the target data item is potentially mislabeled in response to determining that the reconstruction error ratio exceeds a certain threshold;

assigning the target data item to one of a plurality of confidence categories based on the reconstruction error ratio; and automatically performing a dataset modification operation based on the assigned confidence category, including by excluding the target data item from a training dataset used to train a downstream machine learning classifier.

* * * * *